US012792444B2

(12) United States Patent
Lee et al.

(10) Patent No.: US 12,792,444 B2
(45) Date of Patent: Nov. 10, 2026

(54) METHOD AND APPARATUS FOR FAULT DIAGNOSTIC OF PROGRAMMABLE ROBOT

(71) Applicant: AJOU UNIVERSITY INDUSTRY-ACADEMIC COOPERATION FOUNDATION, Gyeonggi-do (KR)

(72) Inventors: Jung Won Lee, Seoul (KR); Ye Seul Park, Incheon (KR); Dong Yeon Yoo, Gyeonggi-do (KR); Ji Hoon Baek, Gyeonggi-do (KR)

(73) Assignee: AJOU UNIVERSITY INDUSTRY-ACADEMIC COOPERATION FOUNDATION, Gyeonggi-do (KR)

( * ) Notice: Subject to any disclaimer, the term of this patent is extended or adjusted under 35 U.S.C. 154(b) by 408 days.

(21) Appl. No.: 17/972,538

(22) Filed: Oct. 24, 2022

(65) Prior Publication Data

US 2023/0126283 A1 Apr. 27, 2023

(30) Foreign Application Priority Data

Oct. 25, 2021 (KR) ........................ 10-2021-0142661

(51) Int. Cl.
*G06F 11/07* (2006.01)
*G05B 19/05* (2006.01)

(52) U.S. Cl.
CPC .......... *G06F 11/079* (2013.01); *G05B 19/058* (2013.01); *G06F 11/0736* (2013.01)

(58) Field of Classification Search
CPC . G06F 11/079; G06F 11/0736; G05B 19/058; G05B 23/02
See application file for complete search history.

(56) References Cited

U.S. PATENT DOCUMENTS

2015/0016731 A1* 1/2015 Kitajima ............ G06V 10/7515 382/199
2016/0096270 A1* 4/2016 Ibarz Gabardos ....... B25J 9/163 901/3

(Continued)

FOREIGN PATENT DOCUMENTS

KR 2019-0001415 1/2019

OTHER PUBLICATIONS

Kiyoshi Hasegawa, "Trouble forecasting and diagnosing method for teaching playback type robot" (English translation of Japanese publication JP S63-123105A), May 26, 1988, ip.com machine translation of Japanese publication JP S63-123105A (Year: 1988).*

(Continued)

*Primary Examiner* — Christopher W Carter
(74) *Attorney, Agent, or Firm* — Foley & Lardner LLP

(57) ABSTRACT

The present invention relates to a method and apparatus for fault diagnosis of a programmable robot, and includes the steps of collecting sensing data corresponding to an operation of a programmable robot, identifying a program and motion related to the sensing data, generating an execution pattern based on the sensing data, extracting a standard pattern corresponding to the identified program and motion, and diagnosing a fault of the programmable robot by comparing the standard pattern with the execution pattern, and the present invention may be applicable as another embodiment.

8 Claims, 5 Drawing Sheets

(56) References Cited

U.S. PATENT DOCUMENTS

| | | | | |
|---|---|---|---|---|
| 2016/0279794 | A1* | 9/2016 | Inagaki | B25J 9/1674 |
| 2017/0299657 | A1* | 10/2017 | Vinson | H02P 29/024 |
| 2024/0351209 | A1* | 10/2024 | Graabæk | G06N 20/00 |

OTHER PUBLICATIONS

Park et al., "Programmable Motion-Fault Detection for a Collaborative Robot," Digital Object Identifier, vol. 9, Sep. 22, 2021, pp. 133123-133142.
Office Action from Korean Patent Application No. 10-2021-0142661, dated Mar. 28, 2024.

* cited by examiner

METHOD AND APPARATUS FOR FAULT DIAGNOSTIC OF PROGRAMMABLE ROBOT

CROSS REFERENCE TO RELATED APPLICATION

The present application claims priority to Korean Patent Application No. 10-2021-0142661, filed Oct. 25, 2021, the entire contents of which is incorporated herein for all purposes by this reference.

BACKGROUND OF THE INVENTION

Field of the Invention

The present invention relates to a method and apparatus for fault diagnosis of a programmable robot.

Description of the Related Art

The smart factory refers to an intelligent production factory that can improve productivity, quality and customer satisfaction by combining the information and communications technology (ICT), in which digital automation solutions are combined, with industrial robots in the production process of design development, manufacturing, distribution, logistics and the like. This smart factory requires technologies that combine artificial intelligence technology to predict equipment failure and diagnose faults in order to respond in advance to fatal situations such as production line interruptions and quality recalls.

Particularly, in recent years, smart factories are increasingly using collaborative robots programmed to perform various tasks, unlike industrial equipment in which the types of tasks to be performed are limited. However, these collaborative robots have a problem in that it is difficult to perform health evaluation with a fixed analysis technique because data patterns are complex due to the diversity of task programs.

In order to perform health evaluation, currently, a method for detecting a value above or below a certain threshold as an anomaly in the collected sensing data, or a method for setting a certain threshold range from the collected sensing data and detecting a value outside the range as an anomaly is used. However, this method has a problem in that it is difficult to apply to a collaborative robot in which a wide range of sensing data is measured according to motion.

SUMMARY OF THE INVENTION

Embodiments of the present invention for solving these conventional problems provides a method and apparatus for fault diagnosis of a programmable robot that defines a standard pattern for each program and motion-specific operation of a programmable robot, and can diagnose fault of the programmable robot based on the defined standard pattern.

A method for fault diagnosis according to an embodiment of the present invention comprising collecting sensing data corresponding to an operation of a programmable robot, identifying a program and motion related to the sensing data, generating an execution pattern based on the sensing data, extracting a standard pattern corresponding to the identified program and motion, and diagnosing a fault of the programmable robot by comparing the standard pattern with the execution pattern.

In addition, the diagnosing a fault of the programmable robot comprises diagnosing that a fault is occurred in the programmable robot if a difference between the standard pattern and the execution pattern is greater than or equal to a threshold.

In addition, further comprising, before the collecting sensing data, defining the standard pattern based on the sensing data corresponding to the operation of the programmable robot.

In addition, the defining the standard pattern comprises collecting the sensing data corresponding to the operation of the programmable robot and identifying and indexing the program and motion related to the operation of the programmable robot based on the sensing data.

In addition, the identifying and indexing the program and motion comprises identifying and indexing the program related to the operation of the programmable robot and identifying and indexing at least one motion included in the program.

In addition, further includes, after the identifying and indexing a program and motion, grouping the sensing data for each of the program and grouping the sensing data for each of the motion.

In addition, the defining the standard pattern comprises defining and storing the standard pattern for each of the program and for each of the motion based on the grouped sensing data.

Also, an apparatus for fault diagnosis according to an embodiment of the present invention comprises a communication unit that receives sensing data corresponding to an operation of a programmable robot from the programmable robot and a control unit that identifies a program and motion related to the sensing data, extracts a standard pattern corresponding to the program and the motion, and compares an execution pattern generated based on the sensing data with the standard pattern to diagnose a fault of the programmable robot.

In addition, the control unit diagnoses that a fault is occurred in the programmable robot if a difference between the execution pattern and the standard pattern is greater than or equal to a threshold.

In addition, the apparatus further comprising a memory that stores the standard pattern defined based on the sensing data corresponding to the operation of the programmable robot.

In addition, the control unit collects the sensing data corresponding to the operation of the programmable robot, and identifies and indexes the program related to the operation of the programmable robot and at least one motion included in the program based on the sensing data.

In addition, the control unit identifies and indexes the program related to the operation of the programmable robot, and identifies and indexes at least one motion included in the program.

The control unit groups the sensing data for each of the program.

In addition, the control unit groups the sensing data for each of the motion.

The control unit defines the standard pattern for each of the program and each of the motion based on the grouped sensing data and stores the defined standard pattern in the memory.

DETAILED DESCRIPTION OF THE INVENTION

Figure 1:
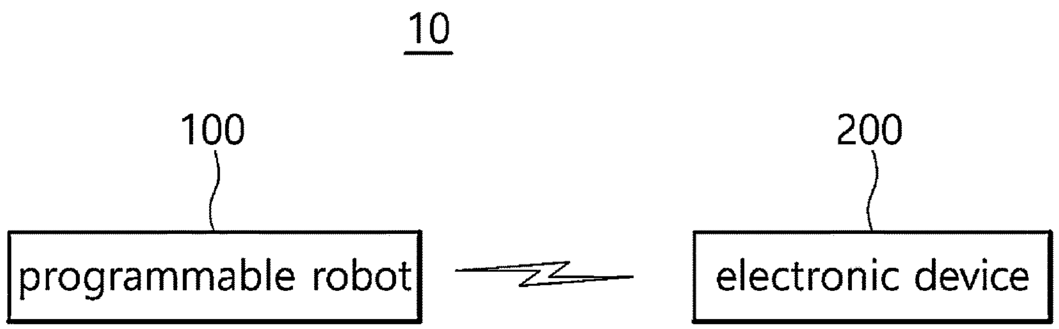
FIG. 1 is a diagram illustrating a system for diagnosing a fault of a programmable robot according to an embodiment of the present invention.

Hereinafter, preferred embodiments according to the present invention will be described in detail with reference to the accompanying drawings. The detailed description set forth below in conjunction with the accompanying drawings is intended to describe exemplary embodiments of the present invention and is not intended to represent the only embodiments in which the present invention may be practiced. In order to clearly describe the present invention in the drawings, parts not related to the description may be omitted, and the same reference numerals may be used for the same or similar components throughout the specification.

FIG. 1 is a diagram illustrating a system for diagnosing a fault of a programmable robot according to an embodiment of the present invention.

Referring to FIG. 1, a system 10 according to the present invention includes a programmable robot 100 and an electronic device 200. In addition, although an embodiment of the present invention has been described as an example that the electronic device 200 communicates with one programmable robot 100, the present invention is not limited thereto, and the electronic device 200 may communicate with a plurality of programmable robots.

The programmable robot 100 is a type of robots that build various environments including a smart factory system, and refers to a collaborative robot that is put into delicate tasks that requires human participation and performs various tasks. Such a programmable robot 100 performs various tasks driven by programming rather than a predetermined fixed task.

Although not illustrated, the programmable robot 100 may include a plurality of joints, and a plurality of sensors provided in at least one of the inside and outside of each joint. The programmable robot 100 operates by designed programming and acquires sensing data associated with the operation. The programmable robot 100 transmits the acquired sensing data to the electronic device 200. To this end, the programmable robot 100 performs at least one of wireless communication and wired communication with the electronic device 200.

Figure 2:
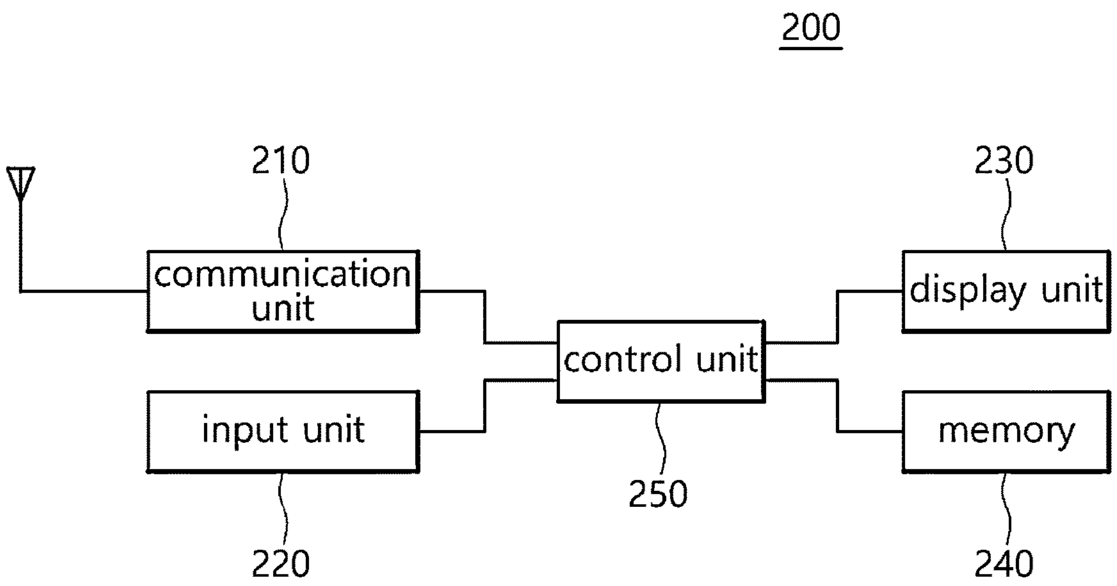
FIG. 2 is a diagram illustrating an electronic device for diagnosing a fault of a programmable robot according to an embodiment of the present invention.

The electronic device 200 is a device such as a computer or a tablet PC, and receives sensing data from the programmable robot 100 through communication with the programmable robot 100. The electronic device 200 indexes a program performed by the programmable robot 100 and motion constituting the program based on the received sensing data, and defines a standard pattern for the program and the motion using the sensing data. In addition, the electronic device 200 generates an execution pattern based on the sensing data acquired according to the operation of the programmable robot 100, and diagnoses a fault of the programmable robot 100 by comparing the execution pattern with a standard pattern. The main configuration of the electronic device 200 will be described in more detail with reference to FIG. 2 below. FIG. 2 is a diagram illustrating an electronic device for diagnosing a fault of a programmable robot according to an embodiment of the present invention.

Referring to FIG. 2, the electronic device 200 according to the present invention includes a communication unit 210, an input unit 220, a display unit 230, a memory 240, and a control unit 250.

The communication unit 210 receives sensing data from the programmable robot 100 through communication with the programmable robot 100, and provides the same to the control unit 250. To this end, the communication unit 210 may perform wireless communication such as $5^{th}$ generation communication (5G), long term evolution (LTE), long term evolution-advanced (LTE-A) and wireless fidelity (Wi-Fi), and perform wired communication using a cable.

The input unit 220 generates input data in response to an input of a user of the electronic device 200. To this end, the input unit 220 may include an input unit such as a keyboard, a mouse, a keypad, a dome switch, a touch panel, a touch key, a button and the like.

The display unit 230 outputs output data according to the operation of the electronic device 200. To this end, the display unit 230 may include a display unit device such as a liquid crystal display unit (LCD), a light emitting diode (LED) display unit, an organic light emitting diode (OLED) display unit and the like. In addition, the display unit 230 may be implemented in the form of a touch screen in combination with the input unit 220.

The memory 240 stores operation programs of the electronic device 200. The memory 240 stores the sensing data received from the programmable robot 100, and stores a program performed by the programmable robot 100 based on the sensing data and a structure of motions constituting the corresponding program. The memory 240 stores the pattern extracted based on the sensing data as a standard pattern. In this case, the standard pattern may be defined and stored for each program and motion performed by the programmable robot 100.

The control unit 250 largely performs two operations to diagnose a fault of the programmable robot 100. First, the control unit 250 defines a standard pattern that serves as a reference for diagnosing a fault. Second, the control unit 250 diagnoses a fault of the programmable robot 100 by comparing an execution pattern generated from the sensing data received from the programmable robot 100 with a defined standard pattern.

Figure 3:
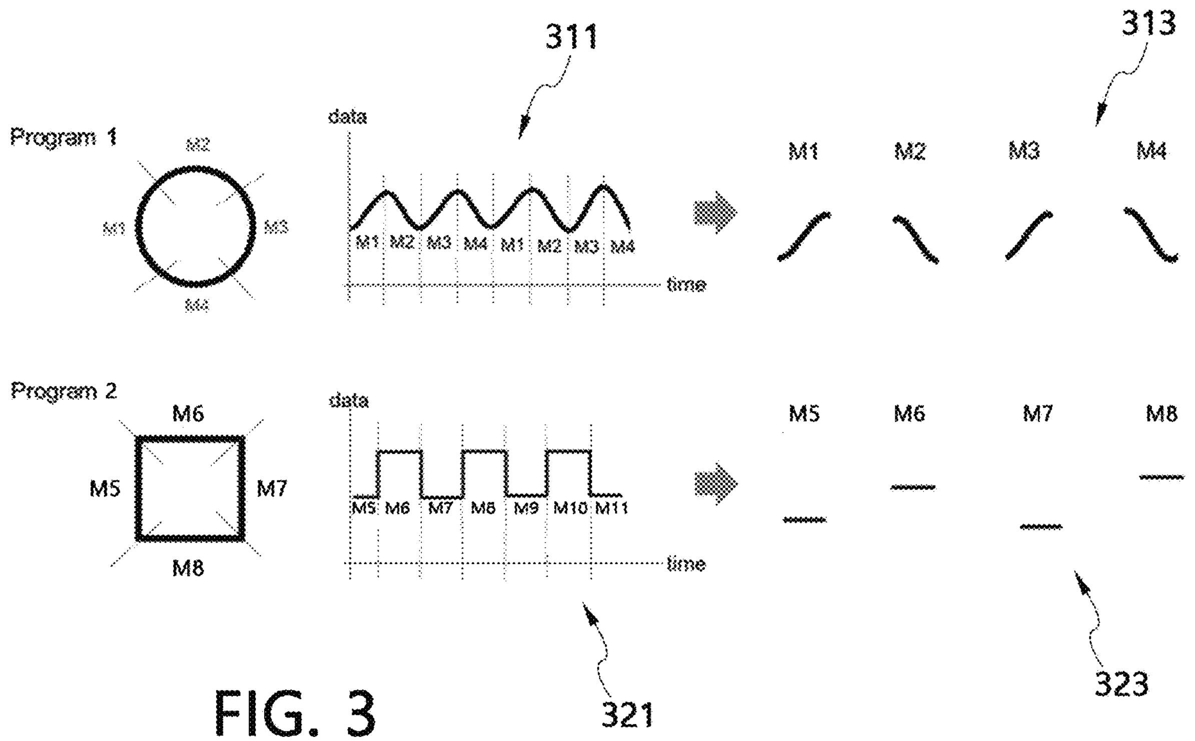
FIG. 3 is an exemplary diagram for describing a method for defining a standard pattern according to an embodiment of the present invention.

In order to define the standard pattern, the control unit 250 uses the method illustrated in FIG. 3. FIG. 3 is an exemplary diagram for describing a method for defining a standard pattern according to an embodiment of the present invention.

Referring to FIG. 3, the programs executed by the programmable robot 100 may be Program1 and Program2. Program1 can be designed to include four motions (M1, M2, M3, M4). Also, Program2 can be designed to include four motions (M5, M6, M7, M8).

The programmable robot 100 transmits the sensing data 311 collected according to the operation of Program1 to the electronic device 200. The control unit 250 may extract a standard pattern 313 for each motion M1, M2, M3, and M4 through analysis of the received sensing data 311. If the standard pattern 313 for each extracted motion is connected, it can become a standard pattern of Program1. In addition, the programmable robot 100 transmits the sensing data 321 collected according to the operation of Program2 to the electronic device 200. The control unit 250 may extract a standard pattern 323 for each motion M5, M6, M7, and M8 through analysis of the collected sensing data 321. If the standard pattern 323 for each extracted motion is connected, it can become a standard pattern of Program2.

More specifically, when a request signal for defining a standard pattern is received from the input unit 220, the control unit 250 receives sensing data corresponding to the operation of the programmable robot 100 from the programmable robot 100. To this end, the control unit 250 may collect normal sensing data by operating the programmable robot 100 when there is no fault in the programmable robot 100, for example, at the time of shipment.

The control unit 250 performs program indexing and motion indexing based on the sensing data corresponding to the operation of the programmable robot 100. Since the control unit 250 can call a program for the operation of the programmable robot 100 by the input of the input unit 220, it is possible to identify a unique ID of the program, and a unique ID for each of a plurality of motions constituting the program can be identified.

In addition, the control unit 250 classifies the sensing data into program units and motion units. In order to define a standard pattern, it is necessary to define the standard pattern after accumulating sufficient reference data by repeatedly performing the same program and the same motion under the same conditions. Accordingly, the control unit 250 may repeatedly perform the same program and the same motion in the programmable robot 100. The control unit 250 may perform indexing for each sensing data based on the number of repetitions of programs and motions.

The control unit 250 performs grouping of the sensing data. In this case, the control unit 250 identifies the unique ID and groups the sensing data corresponding to the program having the same unique ID and the motion having the same unique ID. The control unit 250 analyzes the grouped sensing data to define a standard pattern. The control unit 250 may define the sensing data at the most standard position among the grouped sensing data as a standard pattern. To this end, the control unit 250 may define a standard pattern using various statistical analysis methods, for example, calculating an average value, calculating a correlation coefficient, and the like. The control unit 250 stores the defined standard pattern in the memory 240.

As such, when the definition of the standard pattern is completed, the control unit 250 diagnoses a fault of the programmable robot 100 based on the defined standard pattern. When a fault diagnosis request signal is received from the input unit 220, the control unit 250 receives sensing data according to the operation of the programmable robot 100 through the communication unit 210. The control unit 250 analyzes the log information to identify the unique IDs of the program and motion being executed in the programmable robot 100. The control unit 250 generates an execution pattern by analyzing the received sensing data.

The control unit 250 searches the memory 240 for a standard pattern corresponding to the program and motion having the identified unique ID and extracts the searched standard pattern. The control unit 250 compares the execution pattern with the standard pattern. If a difference between the execution pattern and the standard pattern is greater than or equal to a threshold, the control unit 250 traces back the motion related to the execution pattern that differs from the standard pattern by more than a threshold, and traces back the program including the motion, so it is possible to more accurately diagnose the cause of a fault in the programmable robot 100. The control unit 250 display units the diagnosed cause of the fault on the display unit 230.

Figure 4:
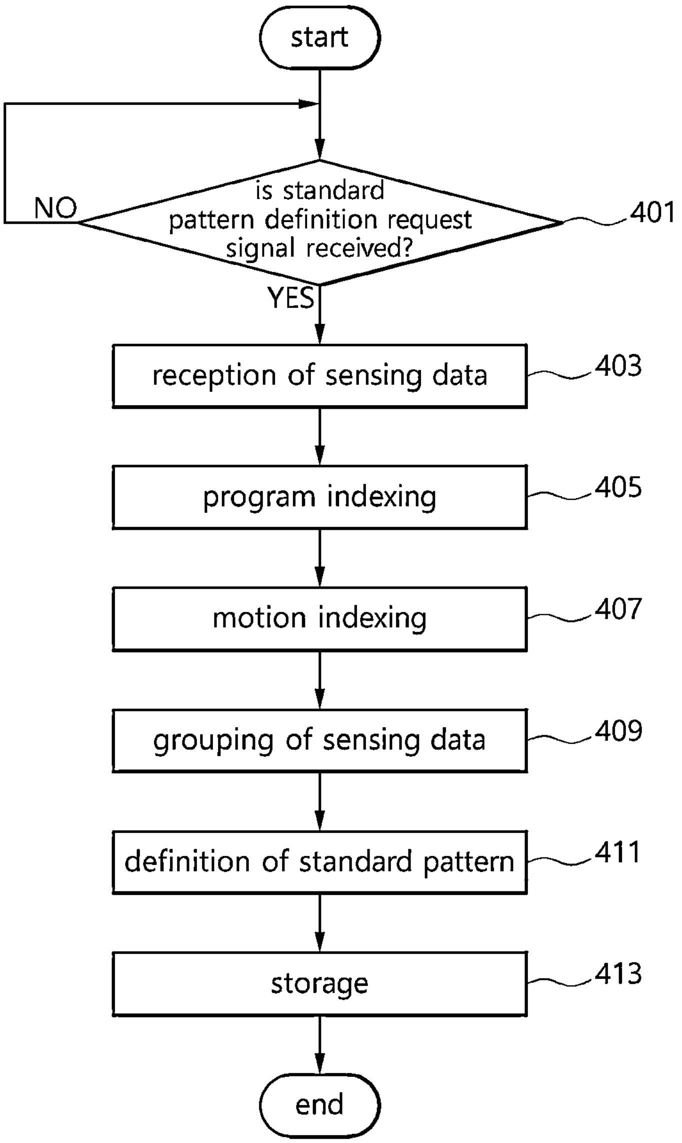
FIG. 4 is a flowchart illustrating a method for defining a standard pattern for fault diagnosis of a programmable robot according to an embodiment of the present invention.

FIG. 4 is a flowchart illustrating a method for defining a standard pattern for fault diagnosis of a programmable robot according to an embodiment of the present invention.

Referring to FIG. 4, in step 401, the control unit 250 identifies whether a request signal for defining a standard pattern is received from the input unit 220. As a result of identification in step 401, if the request signal is received, the control unit 250 performs step 403. If the request signal is not received, the control unit 250 waits for the reception of the request signal.

In step 403, the control unit 250 collects sensing data corresponding to the operation of the programmable robot 100. To this end, the control unit 250 may collect normal sensing data by operating the programmable robot 100 when there is no fault in the programmable robot 100, for example, at the time of shipment. The programmable robot 100 may be operated by a program stored in the programmable robot 100, and the control unit 250 may select a program for operation when there is a plurality of programs stored in the programmable robot 100.

In step 405, the control unit 250 performs program indexing based on the sensing data collected according to the operation of the programmable robot 100, and through the performance of step 407, performs motion indexing based on the sensing data collected according to the operation of the programmable robot 100. More specifically, since the control unit 250 can call a program for operation of the programmable robot 100 by the input of the input unit 220, it is possible to identify the unique ID of the program, and the unique ID for each of the plurality of motions constituting the program can be identified.

In addition, the control unit 250 classifies the sensing data into program units and motion units. In order to define a standard pattern, it is necessary to define the standard pattern after accumulating sufficient reference data by repeatedly performing the same program and the same motion under the same conditions. Accordingly, the control unit 250 may repeatedly perform the same program and the same motion in the programmable robot 100. The control unit 250 may perform indexing for each sensing data based on the number of repetitions of programs and motions.

In step 409, the control unit 250 performs grouping of the sensing data and performs step 411. The control unit 250 groups the sensing data corresponding to the same program and the same motion. In step 411, the control unit 250 defines a standard pattern based on the grouped sensing data, and then performs step 413. In step 413, the control unit 250 stores the defined standard pattern in the memory 240.

Figure 5:
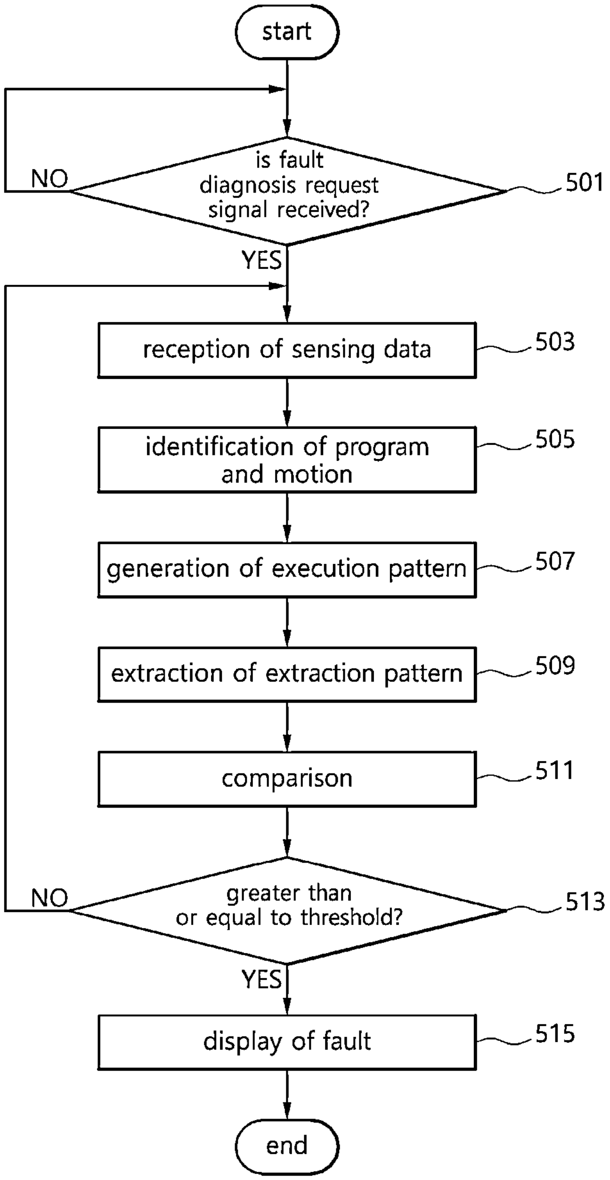
FIG. 5 is a flowchart illustrating a method for performing fault diagnosis of a programmable robot according to an embodiment of the present invention.

FIG. 5 is a flowchart illustrating a method for performing fault diagnosis of a programmable robot according to an embodiment of the present invention.

Referring to FIG. 5, in step 501, the control unit 250 identifies whether a fault diagnosis request signal is received from the input unit 220. As a result of identification in step 501, if the request signal is received, the control unit 250 performs step 503, and if the request signal is not received, the control unit 250 waits for the reception of the request signal.

In step 503, the control unit 250 receives sensing data according to the operation of the programmable robot 100 through the communication unit 210. In step 505, the control unit 250 analyzes the log information to identify the unique IDs of the program and motion being executed in the programmable robot 100. In step 507, the control unit 250 analyzes the received sensing data to generate an execution pattern.

In step 509, the control unit 250 searches for and extracts a standard pattern corresponding to the identified program and motion from the memory 240. In step 511, the control unit 250 compares the extracted execution pattern with the searched standard pattern. In step 513, if a difference between the execution pattern and the standard pattern is greater than or equal to a threshold, the control unit 250 performs step 515. If the difference between the execution pattern and the standard pattern is not greater than or equal to a threshold, the control unit 250 returns to step 503 and performs steps 503 to 513 again. Next, in step 515, the control unit 250 display units the cause of the diagnosis of the fault in the programmable robot 100 on the display unit 230.

Figure 6:
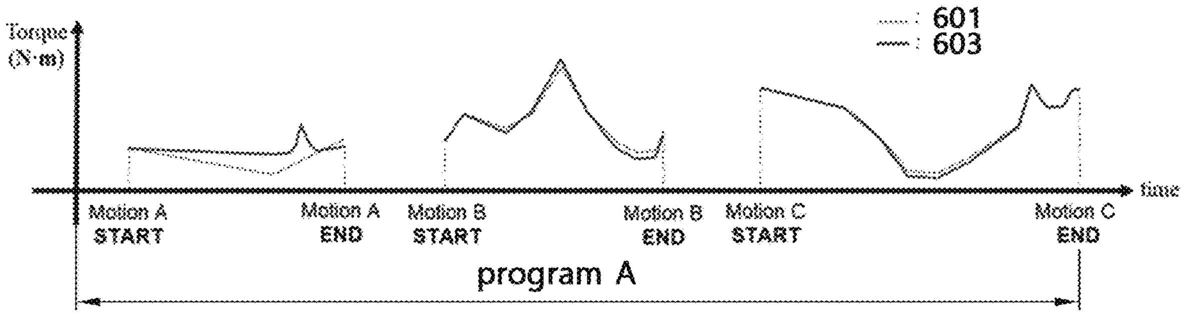
FIG. 6 is an exemplary diagram for describing a fault diagnosis identification according to an embodiment of the present invention.
Figure 7:
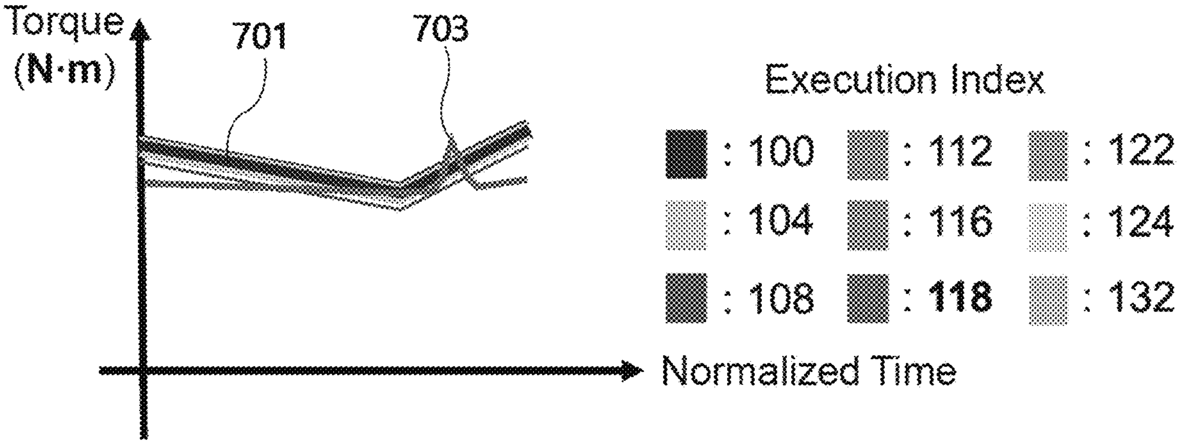
FIG. 7 is an exemplary diagram for describing a fault diagnosis identification according to another embodiment of the present invention.

A method for the control unit 250 to diagnose a fault of the programmable robot 100 will be described in more detail with reference to FIGS. 6 and 7. FIG. 6 is an exemplary diagram for describing a fault diagnosis identification according to an embodiment of the present invention. FIG. 7 is an exemplary diagram for describing a fault diagnosis identification according to another embodiment of the present invention.

Referring to FIG. 6, FIG. 6 shows a graph in which a fault of the programmable robot 100 is diagnosed when ProgramA is executed. ProgramA may be constituted to include MotionA, MotionB, and MotionC. In this case, reference numeral 501 denotes a standard pattern for each motion, and reference numeral 503 denotes an execution pattern for each motion. Through this, the control unit 250 can diagnose that a fault is identified in the programmable robot 100 while executing ProgramA, particularly, performing MotionA constituting ProgramA. In this case, although it is described as an example that the standard pattern and execution pattern of MotionA to MotionC are cut off, this is only for convenience of description and is not necessarily limited thereto.

Referring to FIG. 7, the graphs illustrated in FIG. 7 represent sensing data for motion indexed by 100, 104, 108, 112, 116, 122, 124, and 132. In addition, a graph corresponding to reference numeral 701 in FIG. 7 indicates a standard pattern calculated based on the sensing data received through a plurality of iterations.

In addition, when comparing an execution pattern 703 calculated from the sensing data for motion indexed by 118 with the standard pattern 701, the execution pattern 703 differs from the standard pattern 701 by more than a threshold. Thus, the control unit 250 traces back the motion related to the execution pattern 703 indexed by 118 and traces back the program including the motion, so it is possible to more accurately diagnose the cause of the fault of the programmable robot 100.

As described above, the method and apparatus for fault diagnosis of a programmable robot according to the present invention define a standard pattern for each program and motion of the programmable robot, and diagnose the fault of the programmable robot based on the defined standard pattern, thereby guaranteeing more precise and accurate diagnosis.

The embodiments of the present invention disclosed in the present specification and drawings are merely provided for specific examples in order to easily explain the technical contents of the present invention and help the understanding of the present invention, and are not intended to limit the scope of the present invention. Therefore, the scope of the present invention should be construed as including all changes or modifications derived based on the technical spirit of the present invention in addition to the embodiments disclosed herein are included in the scope of the present invention.

What is claimed is:

1. A method for diagnosing a fault of a programmable robot comprising:

producing a programmable robot including a plurality of joints and a plurality of sensors, the plurality of joints and sensors being operable in response to an operation program;

inputting a first operation program into the programmable robot, and controlling the programmable robot to repeatedly perform a first operation composed of first motions according to the first operation program;

storing, each time the programmable robot repeats the first operation, first sensing data sensed by the plurality of sensors in each of the first motions;

storing first patterns corresponding to each of the first motions based on the first sensing data;

inputting a second operation program into the programmable robot, and controlling the programmable robot to perform a second operation composed of second motions according to the second operation program;

storing second sensing data sensed by the plurality of sensors in each of the second motions;

storing second patterns corresponding to each of the second motions based on the second sensing data;

comparing the first patterns and the second patterns with each other to detect differences corresponding to the first and second motions;

designating a motion corresponding to a difference equal to or greater than a threshold as a fault motion; and controlling the programmable robot to stop or modify an operation of the programmable robot performing the fault motion, in response to the fault motion being designated.

2. The method of claim 1, wherein the second operation program is programmed to perform the same operation as the first operation program.

3. The method of claim 1, wherein the first patterns are designated as data corresponding to average values among the data sensed in each of the first motions.

4. The method of claim 1, further comprising:

assigning a unique ID to the first operation and each of the first motions prior to storing the first patterns; and assigning a unique ID to the second operation and each of the second motions prior to storing the second patterns.

5. The method of claim 4, wherein, when the first and second patterns are compared with each other, the patterns respectively corresponding to the first motion and the second motion having a same unique ID are compared with each other.

6. An apparatus for diagnosing a fault of a programmable robot, comprising:

a communication unit configured to deliver an operation program to a programmable robot including a plurality of joints and a plurality of sensors operable in response to the operation program, and to receive sensing data from the programmable robot;

a memory configured to store information received through the communication unit; and a controller configured to control the programmable robot, the communication unit, and the memory so as to detect a fault motion among motions performed by the programmable robot, wherein the controller is configured to:

input a first operation program into the programmable robot to repeat a first operation, store first patterns corresponding to each of first motions repeated in the first operation, input a second operation program into the programmable robot to perform a second operation, store second patterns corresponding to each of second motions performed in the second operation, detect differences between the first and second patterns, and designate a motion corresponding to a difference equal to or greater than a threshold as the fault motion, and control the programmable robot to stop or modify an operation of the programmable robot performing the fault motion, in response to the fault motion being designated.

7. The apparatus of claim 6, wherein the controller is configured to assign a unique ID to the first operation and each of the first motions, and to assign a unique ID to the second operation and each of the second motions.

8. The apparatus of claim 7, wherein the controller is configured to compare, when the first and second patterns are compared with each other, the patterns respectively corresponding to the first motion and the second motion having a same unique ID.

* * * * *